(12) United States Patent
Imai et al.

(10) Patent No.: US 6,504,683 B1
(45) Date of Patent: Jan. 7, 2003

(54) MAGNETIC DISK APPARATUS IN WHICH CONTACT BETWEEN A DISK AND A CARRIAGE ARM BY AN EXTERNAL IMPACT IS PREVENTED

(75) Inventors: Satomitsu Imai, Odawara (JP); Toshihisa Okazaki, Odawara (JP); Mikio Tokuyama, Tsukuba (JP); Shigeo Nakamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 177 days.

(21) Appl. No.: 09/589,746

(22) Filed: Jun. 9, 2000

(30) Foreign Application Priority Data

Nov. 1, 1999 (JP) ............................................. 11-311273

(51) Int. Cl.[7] ................................................ G11B 21/10
(52) U.S. Cl. ............................... 360/244.5; 360/244.8; 360/254.7
(58) Field of Search .................. 360/244.5, 255, 360/254.7, 254.8, 254.9, 266, 266.1, 245.7, 265.1, 244.8

(56) References Cited

U.S. PATENT DOCUMENTS

| | | | | |
|---|---|---|---|---|
| 4,535,374 A | * | 8/1985 | Anderson et al. | 360/244.9 |
| 4,734,805 A | * | 3/1988 | Yamada et al. | 360/128 |
| 4,939,611 A | * | 7/1990 | Connolly | 360/137 |
| 5,126,904 A | * | 6/1992 | Sakurai | 360/244.2 |
| 5,422,770 A | * | 6/1995 | Alt | 360/244.2 |
| 5,754,371 A | * | 5/1998 | Meyer et al. | 360/244.6 |
| 5,757,587 A | * | 5/1998 | Berg et al. | 360/254.7 |
| 5,764,441 A | * | 6/1998 | Aruga et al. | 360/265 |
| 5,801,899 A | * | 9/1998 | Genheimer | 360/97.01 |
| 5,831,793 A | * | 11/1998 | Resh | 360/244.8 |
| 5,870,252 A | * | 2/1999 | Hanrahan | 360/244.8 |
| 5,903,409 A | * | 5/1999 | Allen et al. | 360/75 |
| 5,936,803 A | * | 8/1999 | Berding | 360/244.8 |
| 6,043,956 A | * | 3/2000 | Hanya et al. | 360/244.9 |
| 6,055,134 A | * | 4/2000 | Boutaghou | 360/254.4 |
| 6,072,664 A | * | 6/2000 | Aoyagi et al. | 360/244.5 |
| 6,201,664 B1 | * | 3/2001 | Le et al. | 360/244.9 |
| 6,215,623 B1 | * | 4/2001 | Zhu | 360/244.3 |
| 6,226,144 B1 | * | 5/2001 | Nagl et al. | 360/97.01 |
| 6,233,120 B1 | * | 5/2001 | Hanada et al. | 360/244.2 |
| 6,236,531 B1 | * | 5/2001 | Allsup et al. | 360/264.2 |
| 6,307,715 B1 | * | 10/2001 | Berding et al. | 360/244.8 |
| 6,341,051 B2 | * | 1/2002 | Hachiya et al. | 360/265.1 |
| 6,351,350 B1 | * | 2/2002 | Symons et al. | 360/244.9 |
| 6,362,936 B2 | * | 3/2002 | Inoue et al. | 360/244.2 |
| 6,392,833 B1 | * | 5/2002 | Wood et al. | 360/69 |

OTHER PUBLICATIONS

IBM TDB, High Shock Resistant HSA/HAA, vol. 38, issue 6, pp. 433–438, Jun. 1, 1995.*

* cited by examiner

Primary Examiner—Brian E. Miller
(74) Attorney, Agent, or Firm—Antonelli, Terry, Stout & Kraus, LLP

(57) ABSTRACT

A magnetic disk apparatus of the present invention comprises a head slider with a magnetic head mounted thereon, a disk on which information is recorded/regenerated by the magnetic head, a spindle motor, integrally structured with the disk, for rotating the disk, a suspension for elastically supporting the magnetic head slider, a carriage arm for supporting the suspension and positioning the magnetic head, and a base plate for attaching the spindle motor and the carriage arm. An out-of-plane primary natural frequency of a base plate part to which the spindle is to be attached is set to be substantially the same as that of a base plate part to which the carriage arm is to be attached. An out-of-plane primary natural frequency of the carriage arm is detached from that of the base plate part to which the carriage arm is to be attached to such an extent that no resonance occurs. An out-of-plane primary natural frequency of the disk is detached from that of the base plate part to which the disk is to be attached to such an extent that no resonance occurs.

4 Claims, 9 Drawing Sheets

MAGNETIC DISK APPARATUS IN WHICH CONTACT BETWEEN A DISK AND A CARRIAGE ARM BY AN EXTERNAL IMPACT IS PREVENTED

BACKGROUND OF THE INVENTION

The present invention relates to a disk apparatus for positioning a recording head on a track of a rotary memory disk to read/write information, more particularly, to a magnetic disk apparatus in which it is prevented for a positioning mechanism from being brought into contact with the disk by an impact force acting on the disk apparatus to destroy the data stored on the disk.

A conventional magnetic disk apparatus is schematically shown in FIG. 1. In FIG. 1, numeral 15 denotes a disk for storing information, 18 denotes a spindle motor for rotating the disk and structured integrally with the disk, 34 denotes a slider with a head mounted thereon, 32 denotes a suspension for supporting the slider, 31 denotes a carriage arm for supporting the suspension, and 33 denotes a voice coil motor for driving the carriage arm. The head is flown by the slider with a slight gap on a disk surface, and positioned in a desired track on the disk by the voice coil motor.

The head is supported by the suspension and the carriage arm. The suspension applies a pressing load to the slider to balance with the flying force, and also serves to flexibly support the slider in a flying direction. The suspension is formed by press-working a thin plate (thickness of usually several tens of micrometers). On the other hand, the carriage arm supports the suspension, and serves to transmit the drive force from the voice coil motor to the suspension. The arm is formed of aluminum and usually has a thickness of several decimillimeters.

In recent years, the magnetic disk apparatus has been demanded to have a superior impact resistance. Not only a hand-carried 2.5 inch magnetic disk apparatus mounted on a note personal computer, but also a 3.5 inch magnetic disk have required good impact resistance.

The 3.5 inch magnetic disk apparatus provided with a long carriage arm has a problem that the carriage arm collides against the disk by the impact force acting on the magnetic disk apparatus.

The countermeasure against the jump of the slider or the suspension proposed in the 2.5 inch magnetic disk apparatus are not effective for restraining the collision of the carriage arm against the disk. As shown in FIG. 2, the out-of-plane rigidity k2z of the spring part of the suspension (rigidity vertical to the plane of the suspension) is designed to be very small as compared with the out-of-plane rigidity k1z of the carriage arm (in order not to deteriorate the follow-up property of the slider to the disk), and no restraint force acts onto the carriage arm from the suspension in an out-of-plane direction.

An object of the present invention is to prevent collision of a carriage arm against a disk by an impact force acting on a magnetic disk apparatus, and to provide new structures to reduce a collision force.

BRIEF SUMMARY OF THE INVENTION

According to one aspect of the present invention, there is provided a magnetic disk apparatus comprises a head slider on which a magnetic head is mounted, a disk on which information is recorded/regenerated by the magnetic head, a spindle motor, integrally structured with the disk, for rotating the disk, a suspension for elastically supporting the magnetic head slider, a carriage arm for supporting the suspension and positioning the magnetic head, and a base plate for attaching the spindle motor and the carriage arm, respectively, wherein an out-of-plane primary natural frequency of the part of the base plate to which the spindle is to be attached is set to be substantially the same as an out-of-plane primary natural frequency of the part of the base plate to which the carriage arm is to be attached; an out-of-plane primary natural frequency of the carriage arm is detached from the out-of-plane primary natural frequency of the base plate part to which the carriage arm is to be attached to such an extent that no resonance occurs; and an out-of-plane primary natural frequency of the disk is detached from the out-of-plane primary natural frequency of the base plate part to which the disk is to be attached to such an extent that no resonance occurs.

According to another aspect of the present invention, there is provided a magnetic disk apparatus comprising: a head slider on which a magnetic head is mounted; a disk on which information is recorded/regenerated by the magnetic head; a suspension for elastically supporting the magnetic head slider; a carriage arm for supporting the suspension and positioning the magnetic head; a suspension mount integrally structured with the suspension, and attached to the carriage arm so that the suspension is held between the carriage arm and the suspension mount; and means, disposed on a tip end of the suspension mount, for relieving the collision of the carriage arm and disk.

In the above-described magnetic disk apparatus, the collision relieving means is a slope disposed on the tip end of the suspension mount so that the contact area with the disk is enlarged during the contact of the suspension mount and disk.

Alternatively, in the above-described magnetic disk apparatus, the collision relieving means is a cushion material disposed on the tip end of the suspension mount.

According to further aspect of the present invention, there is provided a magnetic disk apparatus comprising: a head slider on which a magnetic head is mounted; a disk on which information is recorded/regenerated by the magnetic head; a suspension for elastically supporting the magnetic head slider; a carriage arm for supporting the suspension and positioning the magnetic head; a suspension mount integrally structured with the suspension and attached to the carriage arm so that the suspension is positioned to face the disk; and means, disposed on the part of the suspension opposite to the tip end of the carriage arm, for relieving the collision of the carriage arm and disk.

In the above-described magnetic disk apparatus, the collision relieving means is a rib disposed on the suspension in order to enlarge the contact area with the disk.

Alternatively, in the above-described magnetic disk apparatus, the collision relieving means is a bent part disposed on the suspension in order to enlarge the contact area with the disk.

Alternatively, in the magnetic disk apparatus, the collision relieving means is a cushion material disposed on the suspension.

DETAILED DESCRIPTION OF THE INVENTION

Figure 1:
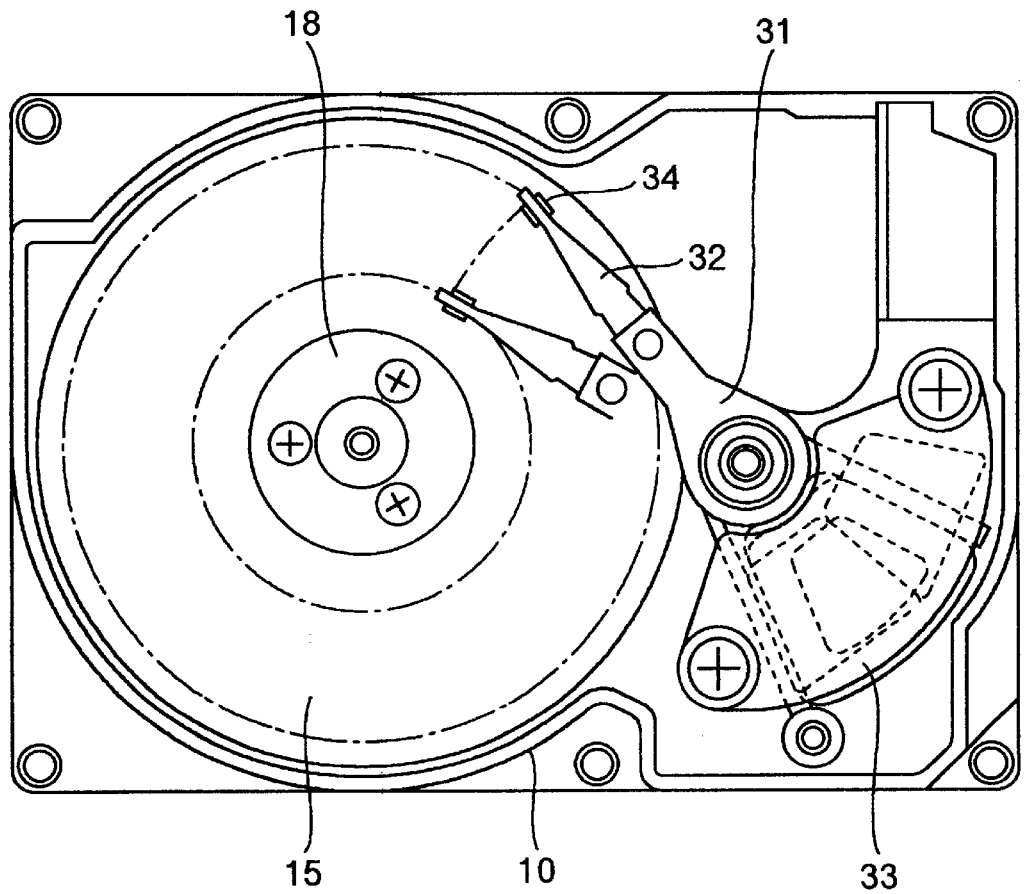
FIG. 1 is a view showing a conventional magnetic disk apparatus.
Figure 2:
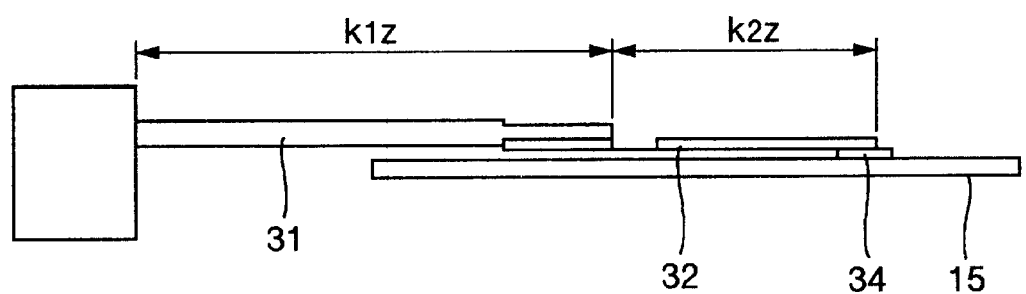
FIG. 2 is a view showing the relation between an out-of-plane rigidity of a carriage arm and an out-of-plane rigidity of a suspension.
Figure 3A:
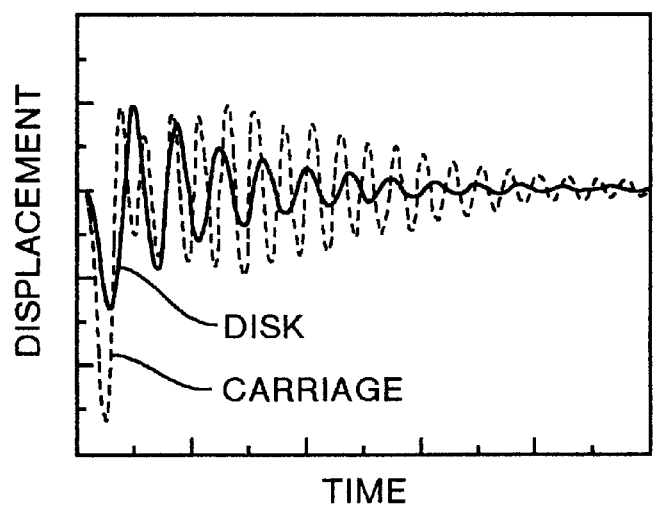
FIG. 3A is a graph showing the deflection/displacement calculation result of the carriage arm and disk by impact input.
Figure 3B:
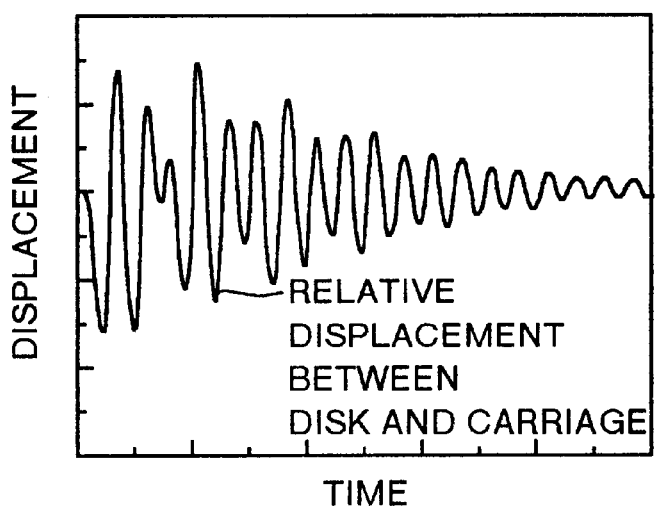
FIG. 3B is a graph showing the relative displacement between the carriage arm and the disk by the impact input based on the result of FIG. 3A.

A mechanism will be described in which the collision of a carriage arm and a disk occurs by an impact force. FIGS. 3A, 3B show results of calculation of time waveform of the displacement generated in a carriage arm tip end and disk right under the tip end by using a finite element process model, when the impact force (sinusoidal half wave) is inputted to the 3.5 inch magnetic disk apparatus.

First vibration waveforms (first half-wave components in FIG. 3A) generated in the carriage arm and the disk are response against the impact input of sinusoidal half wave, and subsequent waveforms are residual vibration. The study of the frequency of the residual vibration has revealed that the frequencies are not the frequencies of the out-of-plane primary vibration of the carriage arm and the disk, but are the out-of-plane primary frequencies of the carriage attaching part and the spindle attaching part of the base plate. Specifically, it has been found that the vibrations of the carriage arm and the disk by the impact force inputted to a magnetic disk apparatus housing are forced vibrations by the out-of-plane vibration of the base plate.

Figure 5:
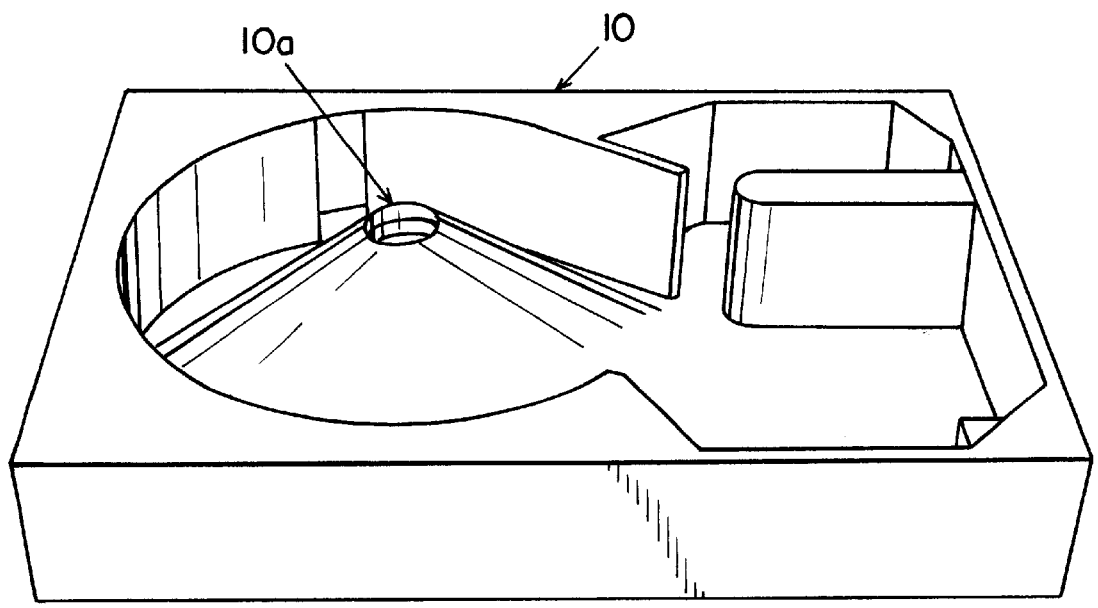
FIG. 5 is a view showing an out-of-plane primary natural vibration mode of the spindle fixing part of a base plate.
Figure 6:
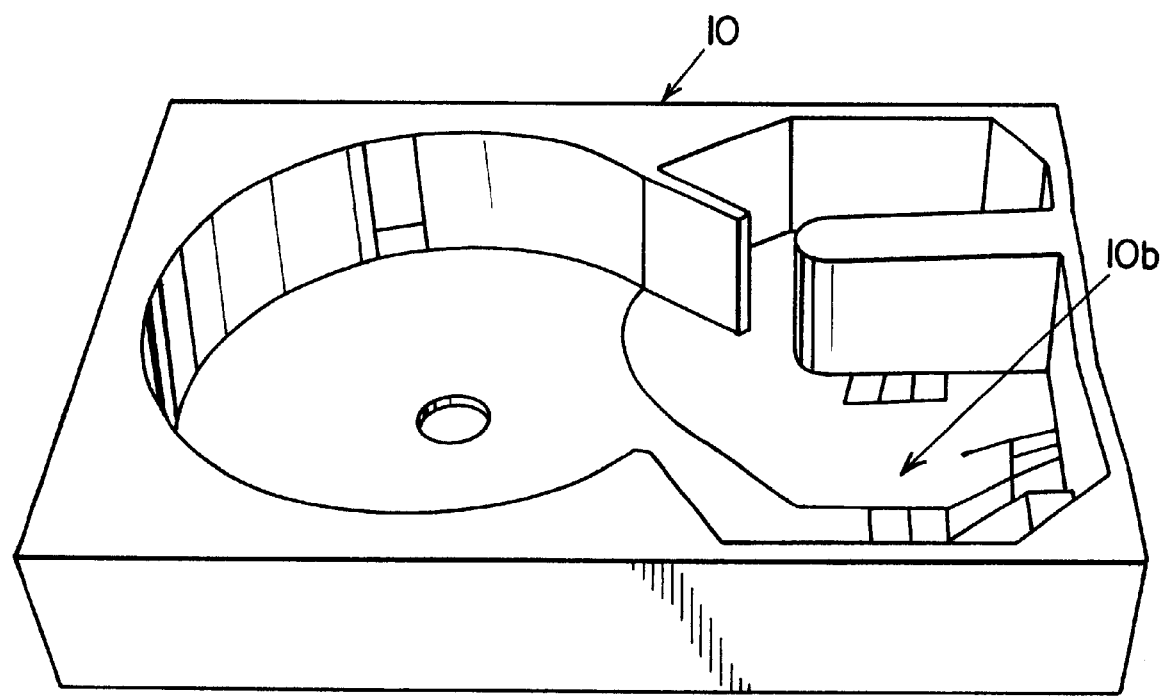
FIG. 6 is a view showing an out-of-plane primary natural vibration mode of the carriage fixing part of the base plate.

The out-of-plane primary vibration modes of the base plate are shown in FIGS. 5 and 6. FIG. 5 shows the out-of-plane primary vibration mode of the base plate part to which the spindle motor is to be attached, and FIG. 6 shows the out-of-plane primary vibration mode of the base plate part to which the carriage as a head positioning mechanism is to be attached. Either frequency is several hundreds of hertz in the 3.5 inch magnetic disk apparatus.

Figure 4:
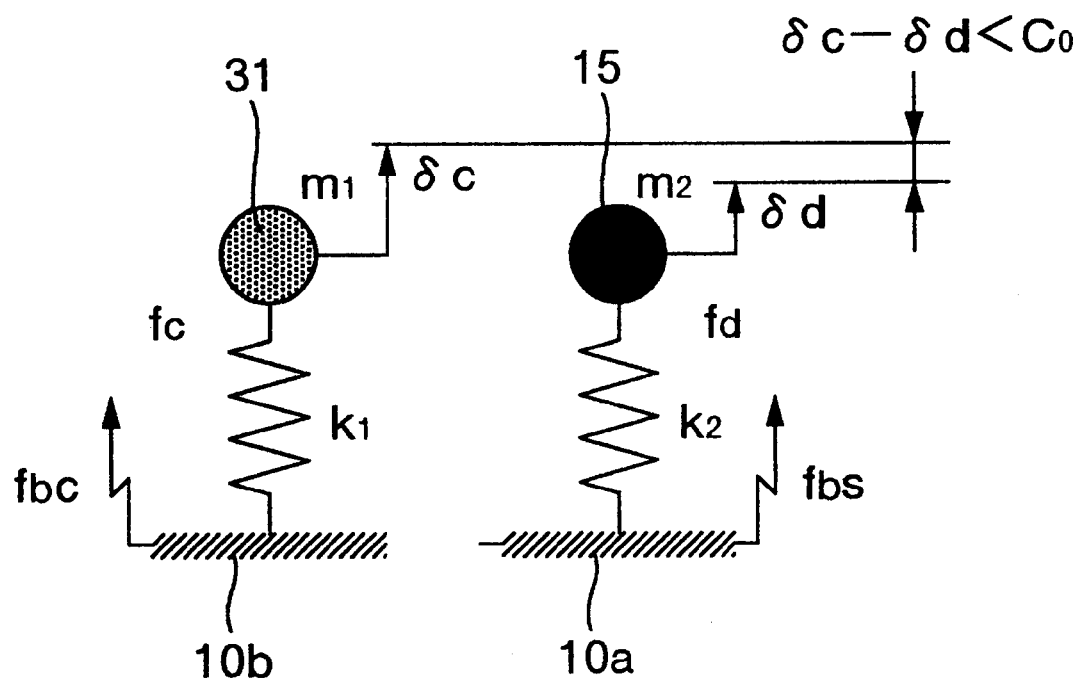
FIG. 4 is a view showing the vibration model of the carriage arm and disk vibrated by the impact input.

A model of excitation of the carriage arm and the disk by the impact force to the magnetic disk apparatus is shown in FIG. 4. In FIG. 4, $m_1$, $k_1$ denote mass and out-of-plane rigidity of the carriage arm, and the out-of-plane primary natural frequency of the carriage arm is represented by $f_c$. On the other hand, $m_2$, $k_2$ denote mass and out-of-plane rigidity of the disk, and the out-of-plane primary natural frequency of the disk is represented by $f_d$. Moreover, the primary natural frequency of the spindle attaching part of the base plate is represented by $f_{bs}$, and the out-of-plane primary natural frequency of the carriage attaching part is represented by $f_{bc}$.

The contact of the carriage arm and the disk occurs when the relative displacement between both at a carriage arm tip end position exceeds an initial clearance of the carriage arm and the disk. Therefore, a relative displacement amplitude needs to be small. To reduce the relative displacement, it is required that both vibration phases agree with each other and that the respective vibration amplitudes be small.

Referring back to FIG. 3B, the maximum value of the relative displacement is generated in a residual vibration area. It is found that the main cause lies in that the residual vibration phases disagree with each other, rather than that the amplitude difference between the residual vibrations of the carriage arm and the disk is large. This reveals that in order to avoid the collision of the carriage arm and the disk, it is more important to allow both vibration frequencies to agree with each other (since the impact force is simultaneously applied to both and both vibration initial phases therefore agree with each other, it is sufficient to allow the vibration frequencies to agree with each other).

The natural frequency for preventing the carriage arm and the disk from vibrating will next be described.

It is ideal to provide the carriage arm and the spindle attaching parts of the base plate with a sufficiently high rigidity, but this cannot actually be realized because the disk mounting density is to be raised. Since the out-of-plane primary natural frequencies are generated as the residual vibration in the carriage arm and the disk by the impact force inputted to the magnetic disk apparatus, in order to make them be the same phase vibrations, it is important to allow these vibration frequencies to agree with each other. Specifically, the out-of-plane primary natural frequency $f_c$ of the carriage arm is agreed with the out-of-plane primary natural frequency (bevel bend mode frequency) $f_d$ of the disk ($f_c = f_d$). The disk natural frequency cannot be changed because of size regulation. Therefore, the carriage arm side is changed. Generally, when the rigidity is high, the natural frequency increases and the amplitude decreases.

As seen from FIG. 4, the carriage arm vibrates with the sum of the out-of-plane rigidity $k_{bc}$ of the carriage attaching part of the base plate and the out-of-plane rigidity $k_c$ of the carriage arm itself, and in the above-described ideal state, the respective frequencies $f_{bc}$ and $f_c$ have a relation $f_c < f_{bc}$, and the amplitude of $f_c$ is larger. Similarly, for the disk, the disk frequency $f_d$ and the frequency $f_{bd}$ of the disk attaching part of the base plate have a relation $f_d < f_{bd}$, and the amplitude of $f_d$ is larger. Therefore, the carriage arm is matched with the disk in out-of-plane frequency ($f_c = f_d$). Specifically, when the rigidity of the attaching part of the base plate is large, the vibration is very small, so that only the vibrations of the carriage arm and the disk themselves may be considered.

On the other hand, in the case in which the carriage arm attaching part and the spindle attaching part of the base plate cannot be provided with sufficiently high rigidity, which is a usual case, the carriage arm and the disk are forced to vibrate by the out-of-plane primary natural frequencies of the carriage arm attaching part and the spindle attaching part of the base plate in a mounted state. Specifically, in the above-described usual case, for the carriage arm, fbc<fc, and the amplitude of fbc is larger. Similarly, for the disk, fbd<fd, and the amplitude of fbd is larger.

Therefore, in the usual case, wholly (not the vibrations of the carriage arm and the disk themselves, but the overall vibrations to which even the vibrations of the attaching parts of the base plate are added), in order to reduce the relative displacement between the carriage arm and the disk, it is important to allow the out-of-plane primary natural frequency of the carriage arm attaching part of the base plate and the out-of-plane primary natural frequency of the spindle attaching part to agree with each other (fbc=fbd). Here, the phases of both attaching parts agree with each other because the impact force is simultaneously applied to both attaching parts.

Moreover, in the above-described normal case, it is also important to reduce the overall amplitudes themselves of the carriage arm and the disk, and in order to realize this, the natural frequencies need to be detached from each other so that the out-of-plane primary natural vibration of the carriage arm causes no resonance with the out-of-plane primary natural vibration of the carriage arm attaching part of the base plate which is a vibrating force. Similarly, the natural frequencies need to be detached from each other to such an extent that the out-of-plane primary natural vibration of the disk does not resonate with the out-of-plane primary natural vibration of the spindle attaching part of the base plate. In other words, the overall amplitudes of the carriage arm and the disk are mainly determined by the amplitudes by the vibrations of these attaching parts, but the amplitudes by the vibrations of the carriage arm and the disk themselves are also added, and therefore, fc and fbc, or fd and fbd do not have to resonate with each other in order to reduce the amplitudes of the carriage arm and the disk. As one example of detachment to such an extent that no resonance occurs, fc≧√2fbc, and fd≧√2fbs are sufficient.

A case will next be described in which the out-of-plane primary natural frequency of the base plate cannot be set as described above for some reason, for example, by a space restriction.

Figure 7:
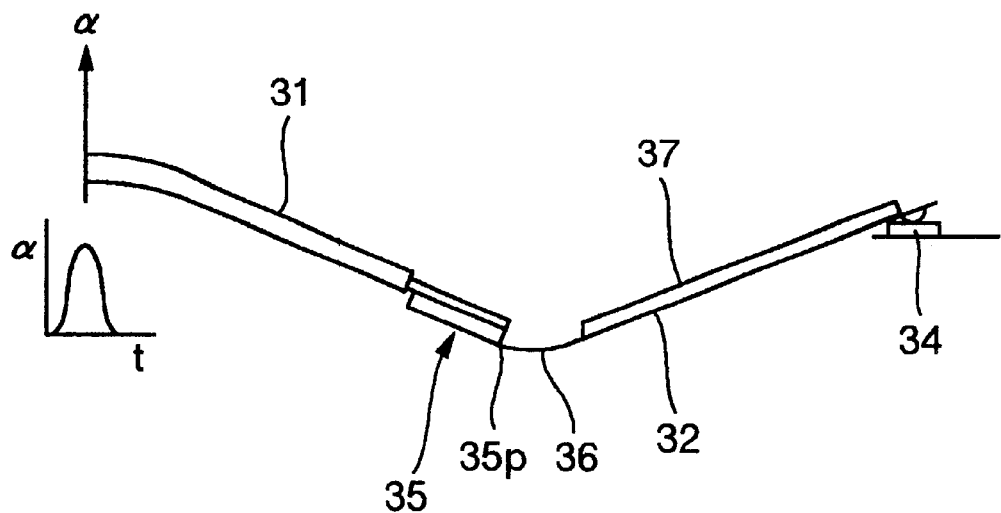
FIG. 7 is a view showing an elastic deformation of the carriage arm when an impact force acts.

First, FIG. 7 shows the deformation shape generated in the carriage arm when the impact force acts on the magnetic disk apparatus. This is equal to the out-of-plane primary vibration mode of the carriage arm 31, and the maximum displacement is generated in the tip end 35p of the carriage arm. Therefore, the means for relieving the contact force should be disposed on the tip end 35p. Actually, since a suspension mount 35 (by which the carriage arm 31 and suspension 32 are assembled by utilizing plastic deformation) is attached in the position of the carriage arm tip end 35p, the collision against the disk occurs at the pointed part on the tip end of the suspension mount 35. In FIG. 7, an impact acceleration acting on the magnetic disk apparatus is represented by α.

Figure 8:
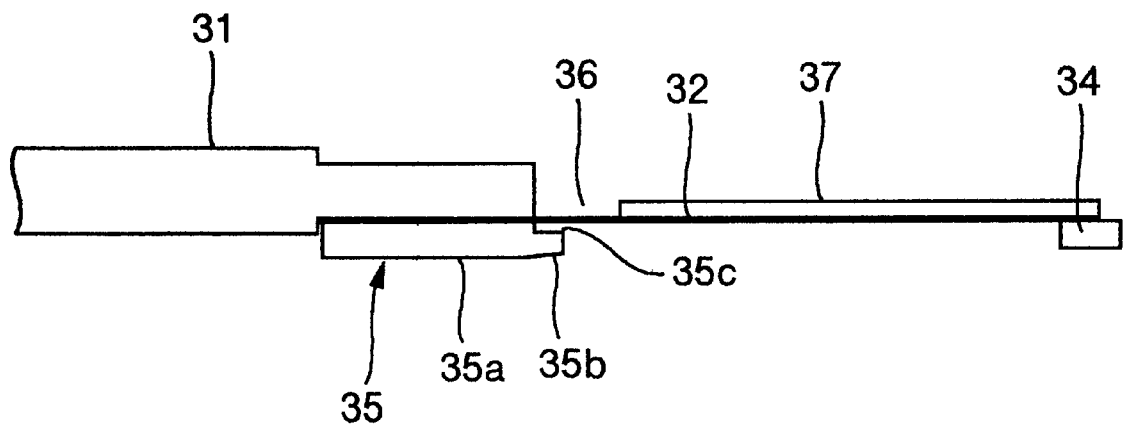
FIG. 8 is a view showing a magnetic disk apparatus provided with a first embodiment of means for reducing the contact force of the carriage arm and the disk according to the present invention.

FIG. 8 shows an example in which the tip end of the mount 35 is provided with a slope as the contact relieving means to increase the contact area and reduce the contact stress. In FIG. 8, numeral 32 denotes a suspension, 35 denotes a suspension mount, and 31 denotes a carriage arm. The suspension 32 is structured integrally with the mount 35. Since an under surface 35a of the mount 35 is used for supporting the suspension mount upon swaging, an extension is disposed on the mount tip end and a slope 35b is disposed on the extension. Since the deflection angle of the carriage arm tip end is remarkably small in a range of about several deci-degrees to one degree, the slope 35b is formed by press-working and the like to provide a slightly inclined surface. Numeral 35c denotes an escape part of the extension and the suspension. When an impact force acts, the carriage arm 31 deflects and the tip-end slope 35b of the mount 35 becomes substantially in parallel with the disk surface when it comes into contact with the disk, so that the contact is relieved. Specifically, since this slope enlarges the contact surface during the contact of the carriage arm and the disk, it is possible to avoid to give a large damage to the disk.

Figure 9:
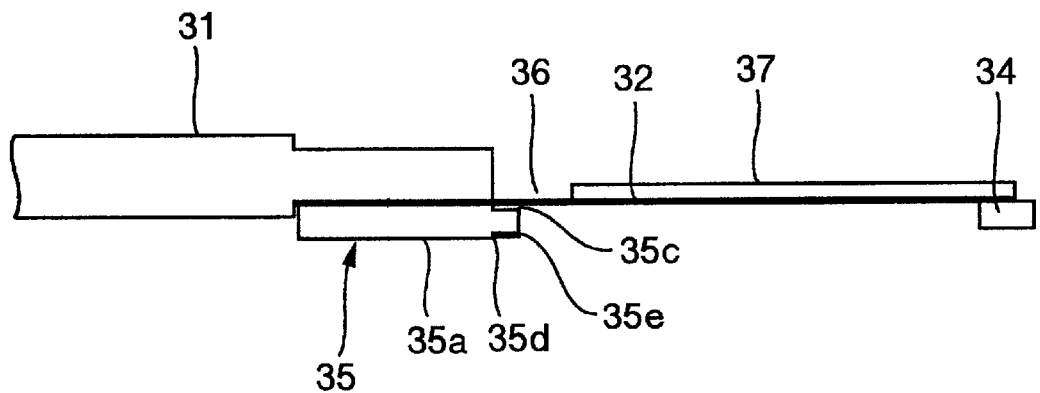
FIG. 9 is a view showing the magnetic disk apparatus provided with a second embodiment of the means for reducing the contact force of the carriage arm and the disk according to the present invention.

FIG. 9 shows an example in which the mount tip end is provided with a cushion material as the contact relieving means. A front extension of the mount 35 is provided with a part 35d for attaching the cushion material thereon, and a cushion material 35e of sheet rubber, plastic, or the like is attached to the part. The cushion material 35e overhangs slightly below an under surface 35a of the mount.

Figure 10:
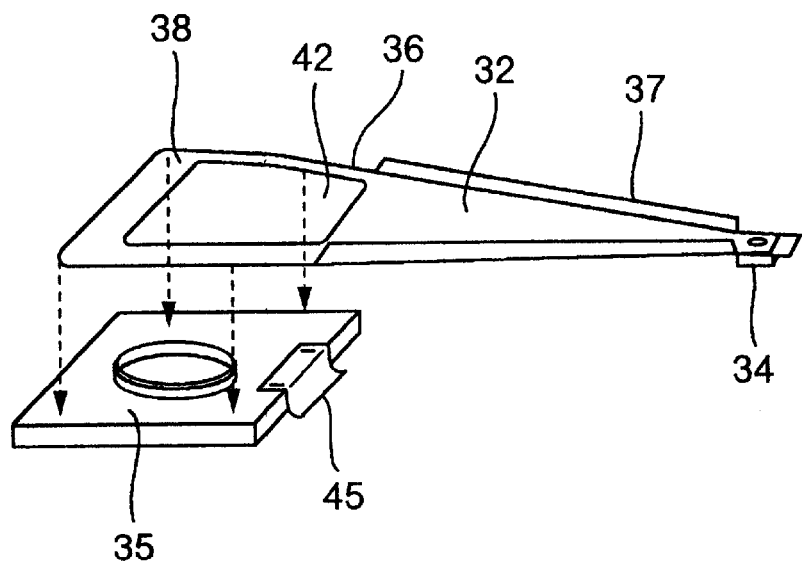
FIG. 10 is a view showing the magnetic disk apparatus provided with a third embodiment of the means for reducing the contact force of the carriage arm and the disk according to the present invention.

FIG. 10 shows an example in which the contact part with the disk is formed by a cushion member 45 different from the member of the suspension and is attached to the mount 35. When the suspension 32 is attached to the mount 35, the cushion member 45 enters a suspension opening 42 and does not interfere with the suspension.

Figure 11:
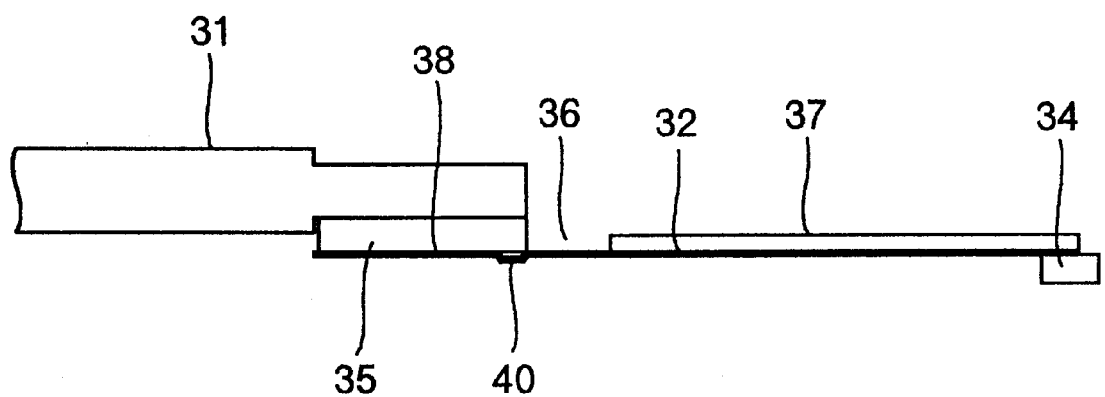
FIG. 11 is a view showing the magnetic disk apparatus provided with a fourth embodiment of the means for reducing the contact force of the carriage arm and the disk according to the present invention.

FIG. 11 shows an example in which a suspension attaching position is the under surface of the mount. In this case, since it is not possible to provide a cushion function to the mount, a mount attaching part 38 of suspension 32 is provided with a cushion function. By disposing a U-shaped rib 40 at a front edge side of the mount attaching part 38 of the suspension 32, the contact area with the disk is enlarged, and the contact stress is reduced. Specifically, by providing the suspension itself with the rib 40, edge-to-edge contact with the disk is prevented.

Figure 12:
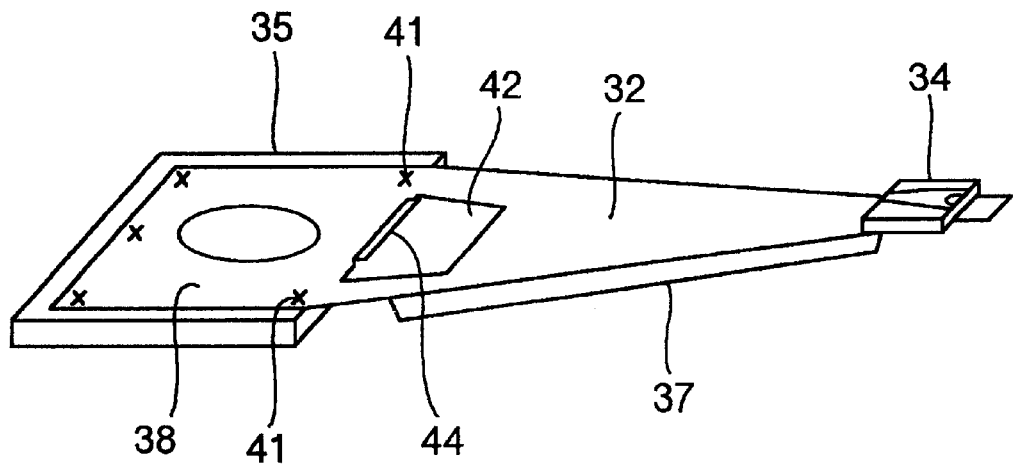
FIG. 12 is a view showing the magnetic disk apparatus provided with a fifth embodiment of the means for reducing the contact force of the carriage arm and the disk according to the present invention.

FIG. 12 shows an example in which a bend 44 is disposed on a front edge of the suspension attaching part 38 in the opening 42 of the suspension 32 to enlarge the contact area with the disk and reduce the contact stress.

Figure 13:
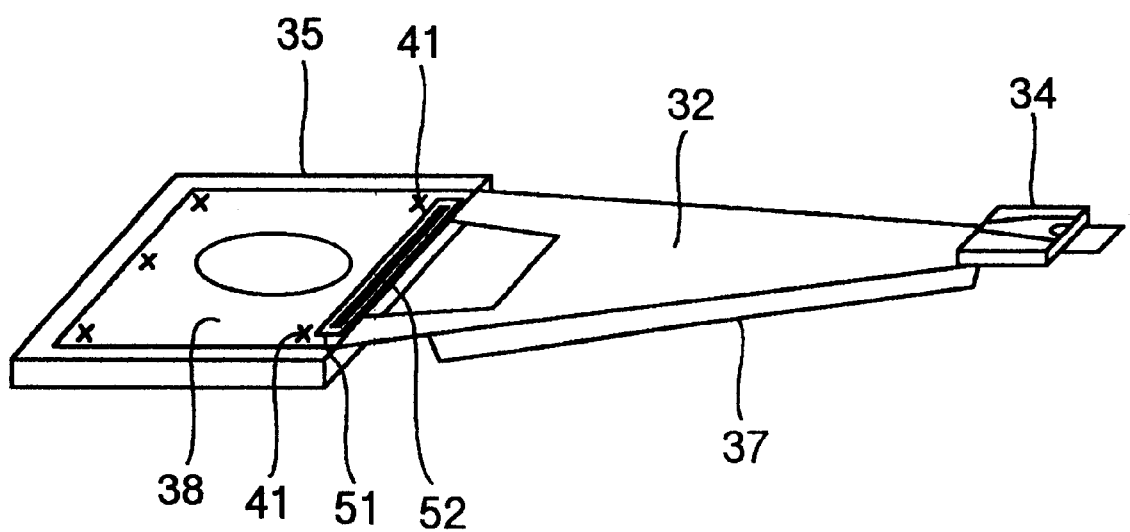
FIG. 13 is a view showing the magnetic disk apparatus provided with a sixth embodiment of the means for reducing the contact force of the carriage arm and the disk according to the present invention.

FIG. 13 shows an example in which a cushion material 52 for relieving the contact force is disposed on a mount front side in the mount attaching part 38 of the suspension 32. Examples of the cushion material include resins such as polyimide. Since the resin is applied as an insulating material for forming a printed wiring to the suspension, it is possible to form the cushion material together at this time. A recess is formed as a resin reservoir 51 in the suspension. This recess is formed by etching. Moreover, the cushion material is applied to the recess so that the material is set to be higher than the suspension surface.

In the above-described constitutions, even if the carriage arm come into contact with the disk, the impact is relieved, and the disk is prevented from being damaged.

We claim:

1. A magnetic disk apparatus comprising:
   a head slider on which a magnetic head is mounted;
   a disk on which information is recorded/regenerated by said magnetic head;
   a spindle motor, integrally structured with said disk, for rotating said disk;

a suspension for elastically supporting said magnetic head slider;

a carriage arm for supporting said suspension and positioning said magnetic head; and a base plate for attaching said spindle motor and said carriage arm thereon, respectively, wherein an out-of-plane primary natural frequency of a part of said base plate to which said spindle motor is to be attached is set to be the same as an out-of-plane primary natural frequency of a part of said base plate to which said carriage arm is to be attached, an out-of-plane primary natural frequency of said carriage arm is detached from the out-of-plane primary natural frequency of the base plate part to which said carriage arm is to be attached to such an extent that no resonance occurs, and an out-of-plane primary natural frequency of said disk is detached from the out-of-plane primary natural frequency of the base plate part to which said disk is to be attached to such an extent that no resonance occurs.

2. The magnetic disk apparatus comprising:

a base plate for attaching a spindle motor for rotating said disk and said carriage arm thereon, respectively; wherein an out-of-plane primary natural frequency of a part of said base plate to which said spindle motor is to be attached is set to be the same as an out-of-plane primary natural frequency of a part of said base plate to which said carriage arm is to be attached, an out-of-plane primary natural frequency of said carriage arm is detached from the out-of-plane primary natural frequency of the base plate part to which said carriage arm is to be attached to such an extent that no resonance occurs, and an out-of-plane primary natural frequency of said disk is detached from the out-of-plane primary natural frequency of the base plate part to which said disk is to be attached to such an extent that no resonance occurs;

a head slider on which a magnetic head is mounted;

a disk on which information is recorded/regenerated by said magnetic head;

a suspension for elastically supporting said magnetic head slider;

a carriage arm for supporting said suspension and positioning said magnetic head;

a suspension mount integrally structured with said suspension, and attached to said carriage arm so that said suspension is held between said carriage arm and the suspension mount; and means, disposed on a tip end of said suspension mount, for relieving a collision of said carriage arm and said disk.

3. The magnetic disk apparatus according to claim 2, wherein said collision relieving means is a slope disposed on the tip end of said suspension mount so that a contact area with said disk is enlarged during the contact of said suspension mount and said disk.

4. The magnetic disk apparatus according to claim 2, wherein said collision relieving means is a cushion material disposed on the tip end of said suspension mount.

* * * * *